Oct. 2, 1923.
H. A. CUMFER
1,469,555
APPARATUS FOR MAKING ROOFING PRODUCT
Original Filed Aug. 9, 1919     4 Sheets-Sheet 4
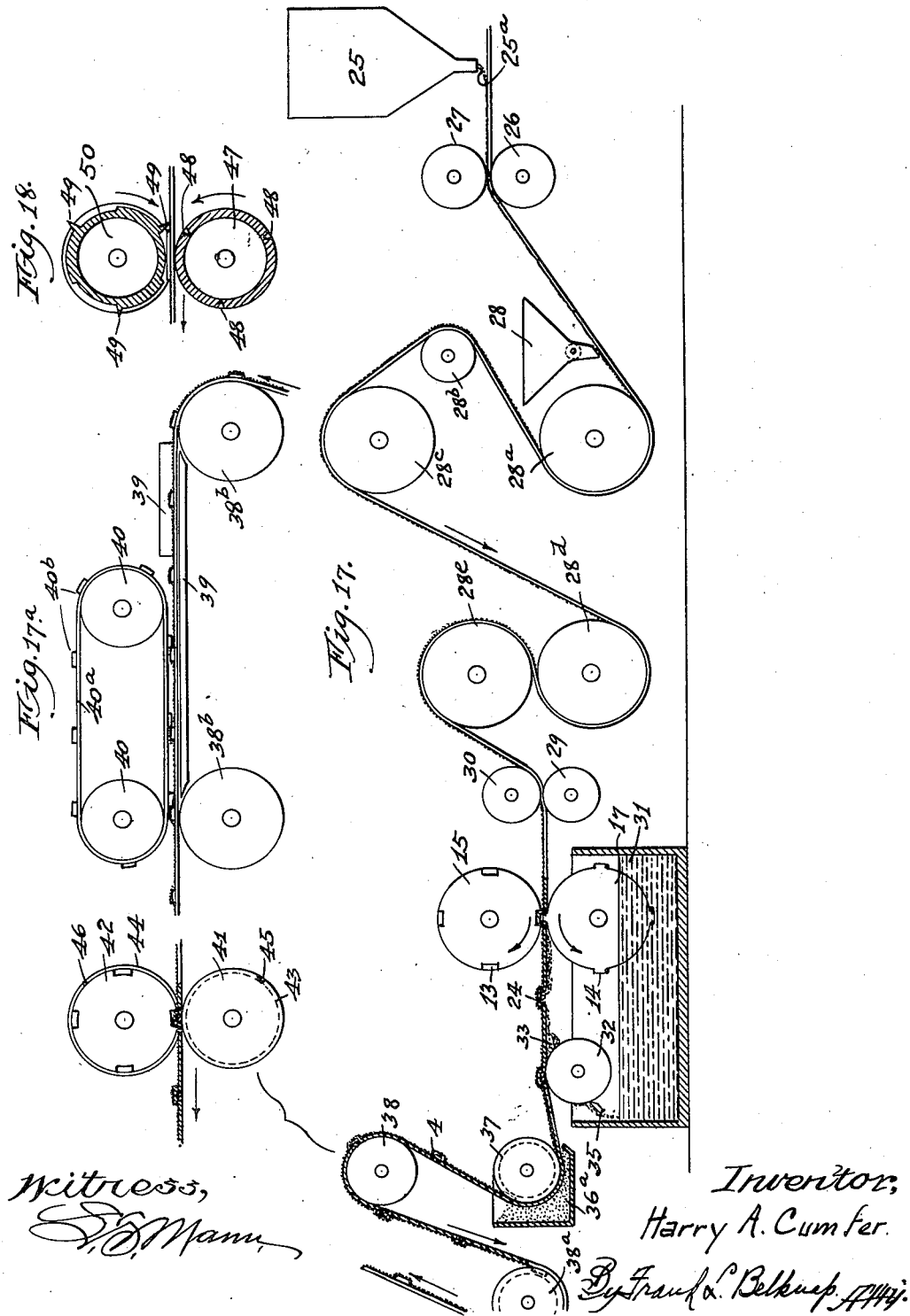
Inventor,
Harry A. Cumfer.

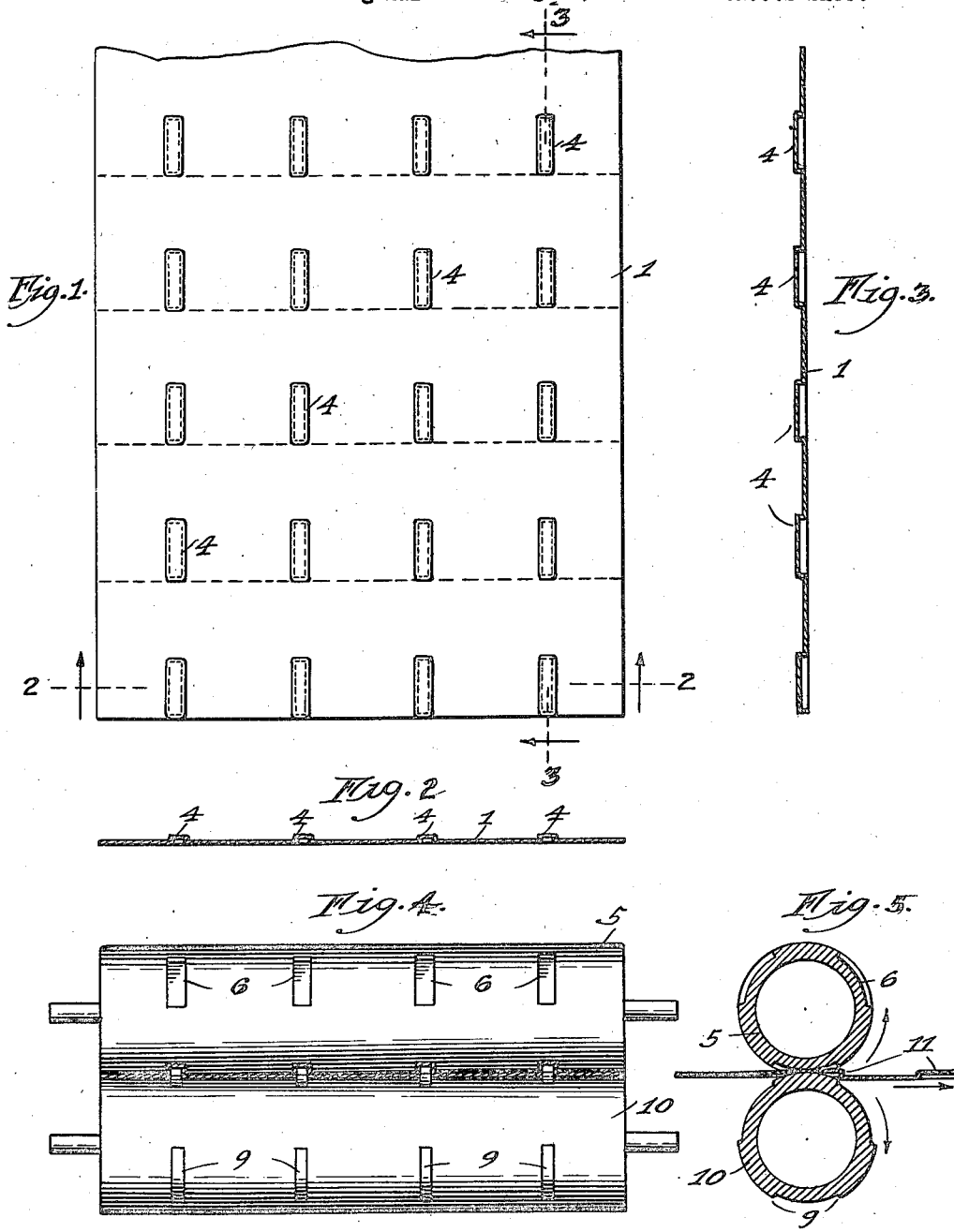

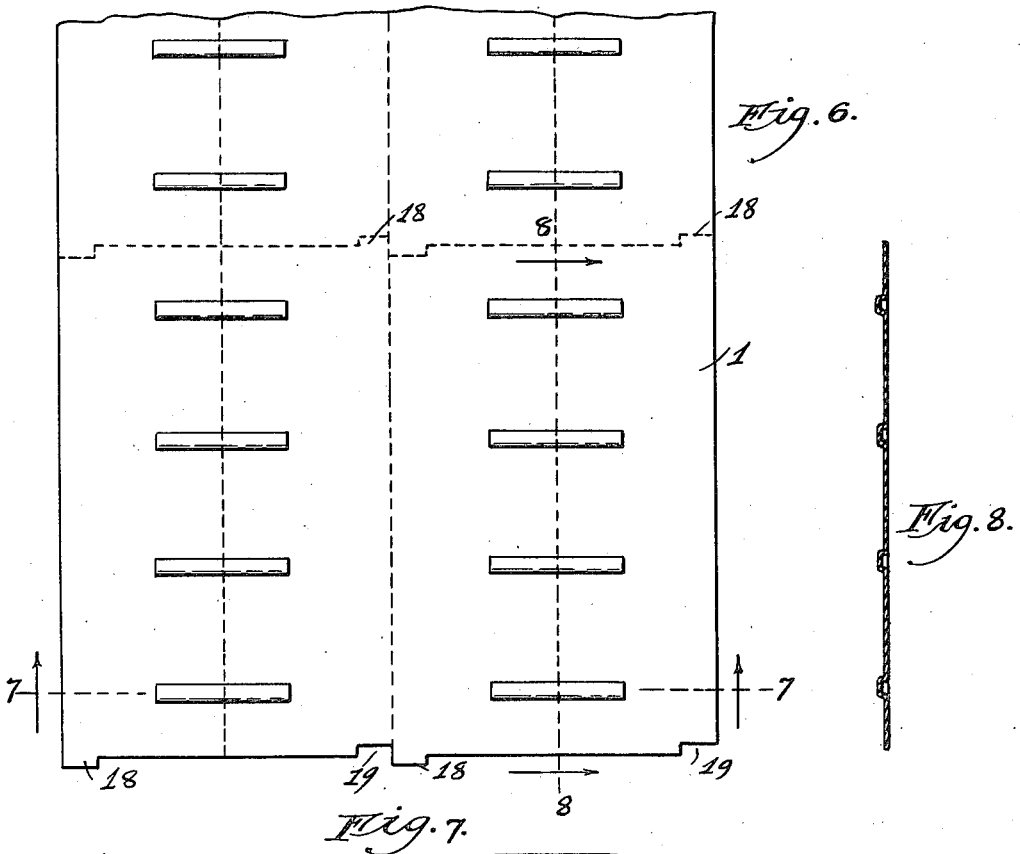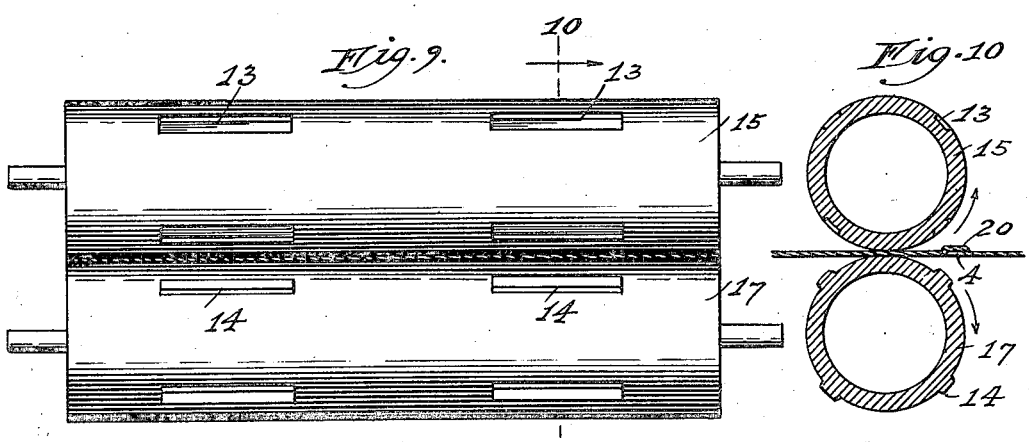

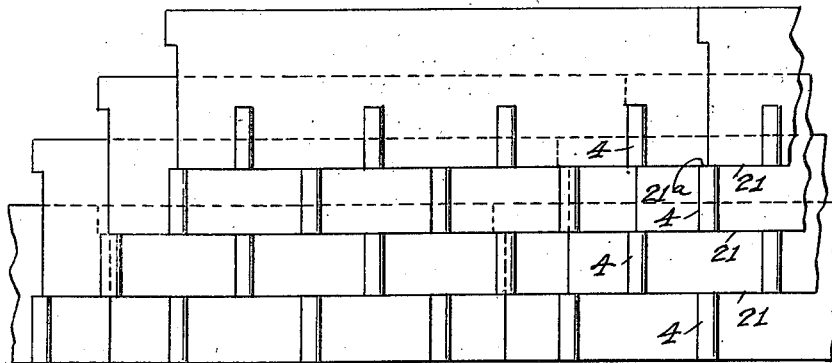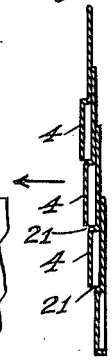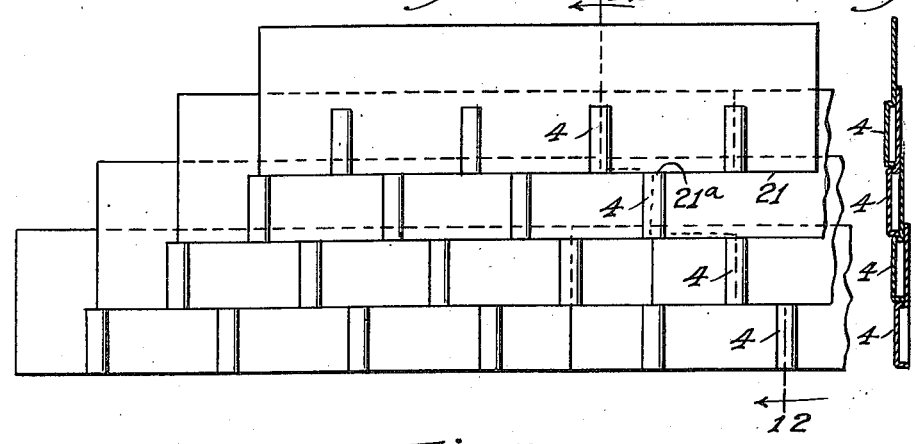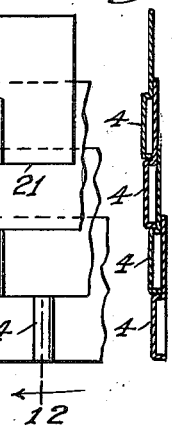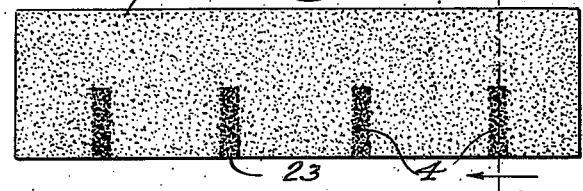

Patented Oct. 2, 1923.

1,469,555

UNITED STATES PATENT OFFICE.

HARRY A. CUMFER, OF CHICAGO, ILLINOIS, ASSIGNOR, BY MESNE ASSIGNMENTS, OF ONE-HALF TO THE FLINTKOTE COMPANY, OF BOSTON, MASSACHUSETTS, A CORPORATION OF MASSACHUSETTS.

APPARATUS FOR MAKING ROOFING PRODUCT.

Original application filed August 9, 1919, Serial No. 316,374. Divided and this application filed July 22, 1921. Serial No. 486,701.

*To all whom it may concern:*

Be it known that I, HARRY A. CUMFER, a citizen of the United States, residing in the city of Chicago, county of Cook, and State of Illinois, have invented certain new and useful Improvements in Apparatus for Making Roofing Product, of which the following is a specification.

This invention is a division of an original application filed by me in the United States Patent Office under date of August 9, 1919, Serial No. 316,374.

The invention relates to an improved machine for producing roofing products and has for its object to produce embossed paper or felt roofing material which has been saturated or impregnated with asphaltum or other bituminous substance and which may or may not have a granular surfacing. It also concerns the hollow pocket formed beneath the embossed part which may be filled to make the lower side of the roofing a smooth surface.

Another important object of the invention is to provide a machine for producing embossed roofing material which has the appearance of shingles, tile or the like and producing them in such a way that there is furnished a mode of laying these roofing strips which is less difficult than the flat roofing strips and can be more permanently affixed due to the lower edge of the strips abutting upon the upper shoulders of the embossed portions of the strips below, making a more unified combination or assembly.

The machine herein disclosed consists of apparatus for producing roofing comprising pliable units cut from a sheet in which are impressed or stamped raised portions which have the concave indentures formed on the under side of the sheet filled with an adhesive substance such as asphalt or other bitumens. The hardening of the adhesive substance in the indenture prevents the flattening of the raised portions which appears on the upper surface of the shingle units and assists materially in laying the shingle. The asphalt which is pressed on the surface of the sheet produces a distinct design which may be made to resemble a shingle design of any type.

In the drawings:

Fig. 1 is a plan view of the roofing material laid out, showing embossed portions; dotted lines along lower edge of embossed pattern indicate where roofing is to be cut to form strips.

Fig. 2 is a sectional view on lines 2—2 of Fig. 1, looking in the direction of the arrows.

Fig. 3 is a sectional view taken on line 3—3 of Fig. 1, looking in the direction of the arrows.

Fig. 4 is a view of the rolls in position, showing one set of embossing dies engaged.

Fig. 5 is a cross section of embossing rolls with roofing material in process of being embossed.

Fig. 6 is a plan view of roofing laid out to show another pattern of embossing, dotted lines indicating lines along which material is cut into uniform strips.

Fig. 7 is a sectional view on line 7—7 of Fig. 6, viewed in direction of arrow.

Fig. 8 is a sectional view on line 8—8 of Fig. 6, viewed in direction of arrows.

Fig. 9 is a view of the rolls in position.

Fig. 10 is a cross section of the rolls, showing section of roofing which has just been embossed.

Fig. 11 is a plan view of section of roofing as applied.

Fig. 12 is a sectional view on irregular dotted line 12—12 of Fig. 11, looking in direction of the arrows.

Fig. 13 is a plan view of section of roofing shown in Fig. 6.

Fig. 14 is an edge view of parts shown in Fig. 13, viewed in the direction of the arrows.

Fig. 15 is a detailed view of roofing strip surfaced with granular material.

Fig. 16 is a sectional view along lines 16—16 of Fig. 15, viewed in direction of arrows.

Fig. 17 is a diagrammatic view in side elevation, partly in cross section, of the apparatus used in producing the product of roofing.

Fig. 17ᵃ is detail view in cross section of cutting rolls for material produced as shown in Figs. 9 and 10.

Fig. 18 is a detail view in cross section of the cutting rolls for material produced as illustrated in Figs. 4 and 5.

Referring to the drawings, in Fig. 1, the roofing material 1 is shown with the embossed portions 4 produced thereon. These raised or embossed patterns are made when the roofing material passes between the embossing rolls 5 and 10 in Fig. 4. The upper pressure roll 5 has upon its surface a series of recesses 6 systematically arranged so as to register with similarly shaped bosses 9, upon the lower bed roll 10. These rolls are revolved by means of any suitable power, not shown, in the direction shown by the arrows in Fig. 5.

In Fig. 5, a section of roofing is shown in the process of being embossed. A cross section of the embossed portion is shown at 11.

In Fig. 9, the recesses 13 and bosses 14 are longitudinally arranged upon the pressure roll 15 and bed roll 17 so as to produce a larger pattern as shown in Fig. 6. The roofing material in Fig. 6 is cut along the dotted lines, making strips with projections 18 and notches 19 along the sides of each strip next to the top edge. These projections and notches are fitted in laying the material as shown in Fig. 13.

In Fig. 10, the roofing material is indicated between the rolls just after the part 20 has received the stamp of the embossing dies.

Fig. 11 is a section of laid roofing, the arrangement of the strips the same as in Fig. 13, except that these strips have not the projections and notches near the top of each strip used to fit them together as shown in Fig. 13. Each strip in both Fig. 11 and Fig. 13 overlaps the one below it and has its lower edge 21 abutted upon the upper shoulders 21ª of the embossed portions 4 of the strip below, thus making a very rigid assembly.

In Fig. 15 is an embossed granular, surfaced roofing strip 22. The dark shaded portions 23 are caused by the bosses 9 on the bed roll 10 shown in Fig. 4, forcing the asphaltic substance through the roofing material, giving the top surface on the embossed parts a darker color than the surrounding material.

In Fig. 16, the pocket 24 under the embossed parts of the strip is shown in cross section filled with material (preferably asphaltic) making a smooth under surface on the strip.

In Fig. 17, the chain of operations is shown in producing the embossed roofing strips. The material is directed through the apparatus by power, not shown. Only that part important to the understanding of my invention is represented. From a receptacle 25, the material receives a coating of adhesive substance 25ª, preferably asphaltic, then passes between the guide rolls 26 and 27. It is then surfaced with a granular mixture from a hopper 28. From there the roofing material is led over a series of cooling rolls 28ª, 28ᵇ, 28ᶜ, 28ᵈ and 28ᵉ, and between two guide rolls 29 and 30 to the embossing rolls 15 and 17 of the character shown in Figs. 9 and 10.

The lower bed roll 17 having the raised bosses 14 upon its periphery turns in the direction which the material is traveling (indicated by the arrows) and being partly immersed in a tank 31, containing asphaltum or like substance, takes up a small quantity of this substance in revolving which it rolls onto the under side of the roofing material.

Another bed roll 32 over which the roofing material passes, gathers the asphaltic substance at 33, spreads it over the under surface of the material and fills the hollow pockets 24 formed by the embossing dies 13 and 14. This makes the bottom of the material a smooth surface.

A scraper 35 cleans the roll 32, removing all excess filler substance that sticks to the roll, causing it to drop back into the reservoir 31.

The roofing material then passes over the bed roll 36 which is peripherally grooved to accommodate the embossed portions 4 as shown by dotted line 37, and rotates in dusting box 36ª which furnishes a non-adhesive coat to the underside of the roofing sheet. The roofing material proceeds over the cooling rolls 38 and 38ª, the latter being similarly grooved as roll 36, it is then conducted onto guide table 39, (Fig. 17ª) by bed rolls 38ᵇ. In Fig. 17ª, a flexible endless conveyer belt 40ª travelling over rolls 40 has fixed upon its surface a series of slats 40ᵇ, so arranged on the belt that the slats take up behind the raised embossed portions and being timed with the severing rolls 41 and 42 feed the material between said rolls in the proper position for cutting into strips. The bed roll 41 is recessed as indicated at 43 to receive the cutting edge 44 on roll 42, for severing the roofing material longitudinally indicated by dotted lines in Fig. 6. The bed roll 41 is also recessed longitudinally at 45 to receive corresponding severing edge 46 mounted on the periphery of roll 42 whereby roofing material is cut transversely as indicated by dotted lines in Fig. 6.

In Fig. 18, the roofing sheet is guided between the several rolls 47 and 50 by a similar mechanism to that shown in Fig. 17ª. The bed roll 47 is recessed at 48 to receive cutting edges 49 mounted longitudinally of cutting roll 50 whereby the roofing material is severed transversely as indicated by dotted lines in Fig. 1. If it is desired to have no granular facing upon the roofing sheet, the hopper 28 must be filled with dust to prevent material sticking to the rolls.

The invention is not limited to the details of this particular apparatus except as pointed out in the appended claims.

I claim as my invention:

1. In an apparatus for making embossed roofing material, the combination with means for feeding a waterproof roofing sheet, of embossing rolls for impressing portions of the sheet into embossed areas, and severing mechanism for cutting the sheet into suitable lengths.

2. In an apparatus of the character described, the combination with means for feeding roofing material of embossing rolls functioning therewith to impress predetermined areas of the sheet into raised embossments, means for filling the depressed portions formed beneath the embossed portions.

3. In an apparatus of the class described, the combination with means for feeding roofing material, of embossing rolls functioning therewith to impress predetermined portions of the sheet into raised embossments, means for applying a filling substance to the depressions produced on the reverse side of the sheet by the embossed portions.

4. In an apparatus of the class described, the combination with means for feeding roofing material, of embossing rolls functioning therewith to impress the sheet into predetermined designs by embossing selected portions of the sheet, mechanism for cutting the material longitudinally and transversely into units.

5. In an apparatus of the character described, the combination with means for feeding roofing material, of embossing rolls functioning therewith to impress embossments into predetermined portions of the sheet, means for applying an adhesive substance to the depressed portions produced on the reverse side of the sheet by the embossments, a pressure roll rescessed to accommodate the embossed pattern and having on its periphery a series of equi-spaced cutting edges arranged to cut the roofing material into units of a predetermined configuration.

6. In an apparatus of the class described the combination with means for feeding a roofing sheet, of embossing rolls functioning therewith and deforming the sheet in predetermined areas to form embossments, means for applying an adhesive substance and a granular non-adhesive material upon the sheet, means for applying an adhesive substance to the depressions in the reverse side of the roofing sheet produced by the embossments, severing mechanism for cutting the material into shingle strips.

7. In an apparatus of the class described, the combination with means for feeding roofing material, of an upper pressure roll having a series of recesses upon its periphery, a lower bed roll provided with bosses which register with depressions in the lower pressure roll, said roll cooperating to impress embossments into predetermined areas of the sheet, a severing mechanism for cutting the material into shingle strips.

HARRY A. CUMFER.